Sept. 11, 1951  N. CHRISTOFILOS (OR PHILOS)  2,567,904
MAGNETIC RESONANCE PARTICLE ACCELERATOR
Filed June 6, 1947  5 Sheets-Sheet 1

Inventor
N. Christofilos,
(Or Philos)
By Wenderoth, Sind + Ponack Attys.

Sept. 11, 1951   N. CHRISTOFILOS (OR PHILOS)   2,567,904
MAGNETIC RESONANCE PARTICLE ACCELERATOR
Filed June 6, 1947   5 Sheets-Sheet 2
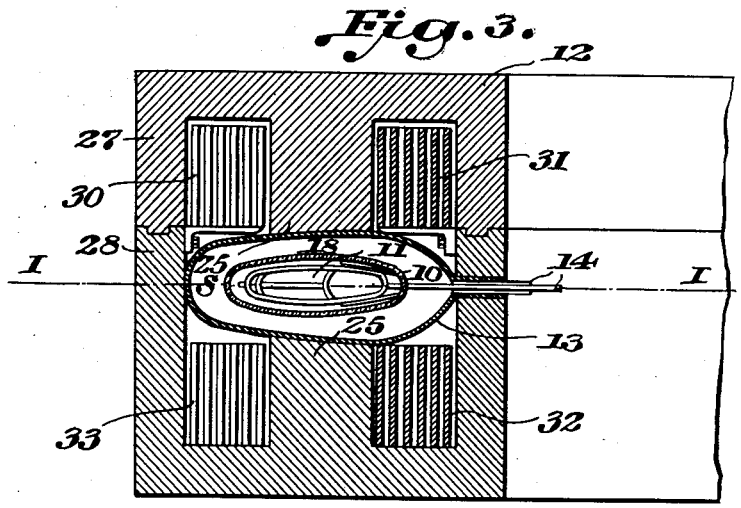
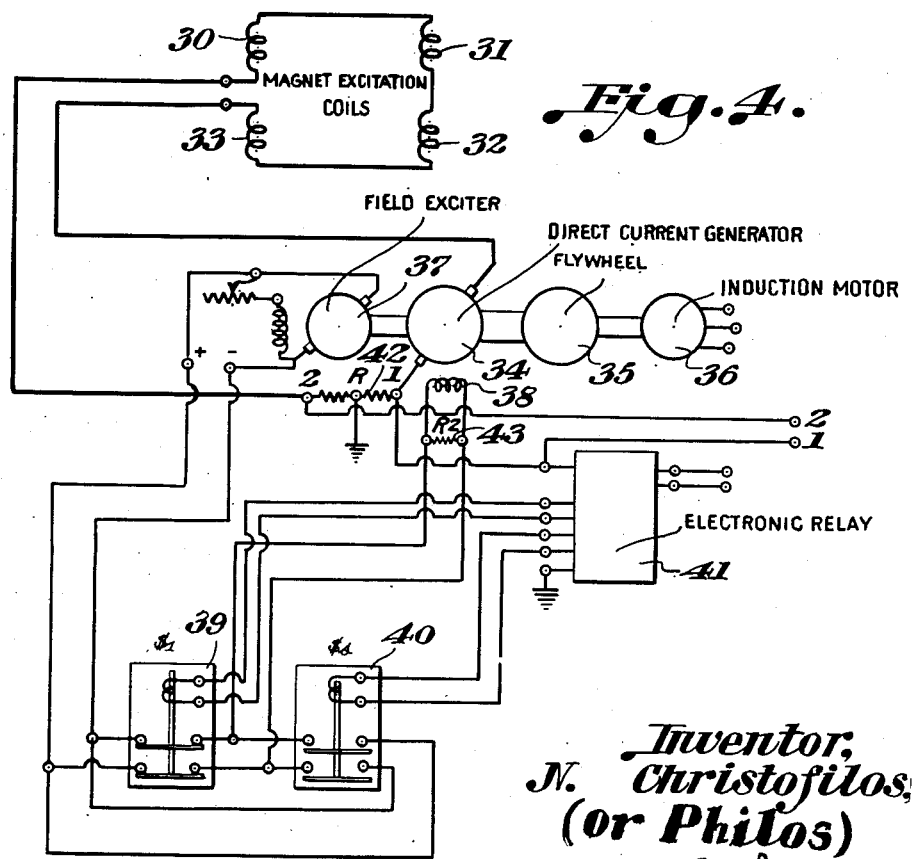
Inventor,
N. Christofilos,
(or Philos)
By Wenderoth, Lind & Ponack attys.

Sept. 11, 1951   N. CHRISTOFILOS (OR PHILOS)   2,567,904
MAGNETIC RESONANCE PARTICLE ACCELERATOR
Filed June 6, 1947   5 Sheets-Sheet 3
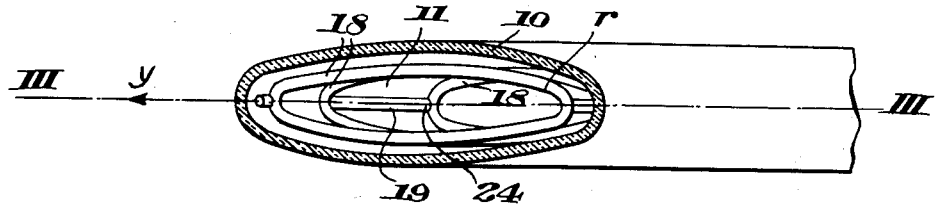
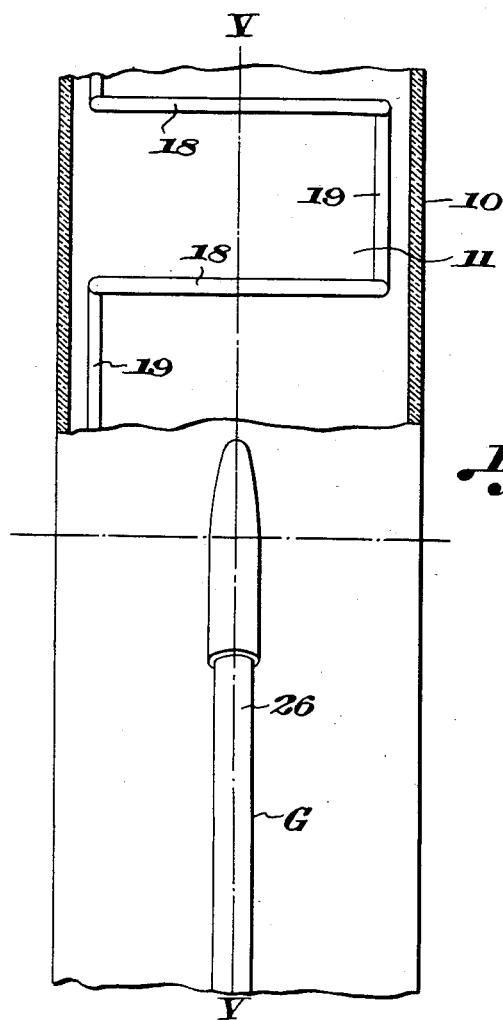
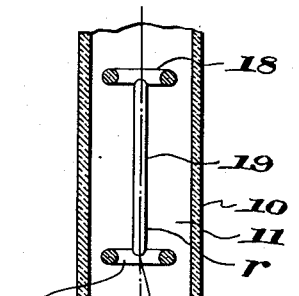
Inventor:
N. Christofilos,
(or Philos)
By Wenderoth, Lind & Ponack Attys.

Sept. 11, 1951   N. CHRISTOFILOS (OR PHILOS)   2,567,904
MAGNETIC RESONANCE PARTICLE ACCELERATOR
Filed June 6, 1947                           5 Sheets-Sheet 4
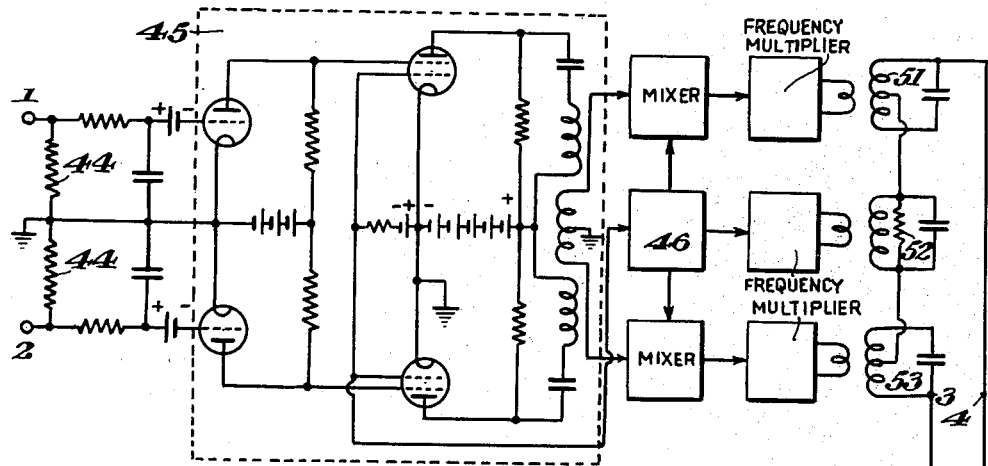
*Fig. 6.*
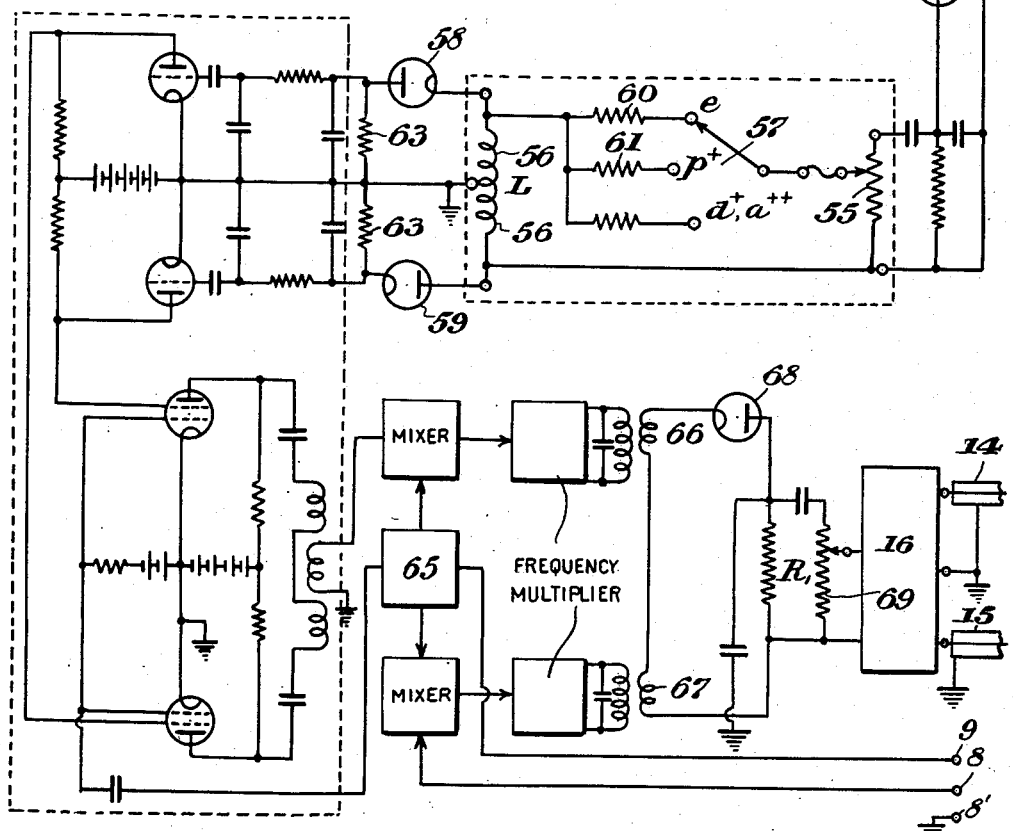
Inventor:
N. Christofilos,
(or Philos)
By Wenderoth, Lind & Ponack attys.

Sept. 11, 1951 N. CHRISTOFILOS (OR PHILOS) 2,567,904
MAGNETIC RESONANCE PARTICLE ACCELERATOR
Filed June 6, 1947 5 Sheets-Sheet 5
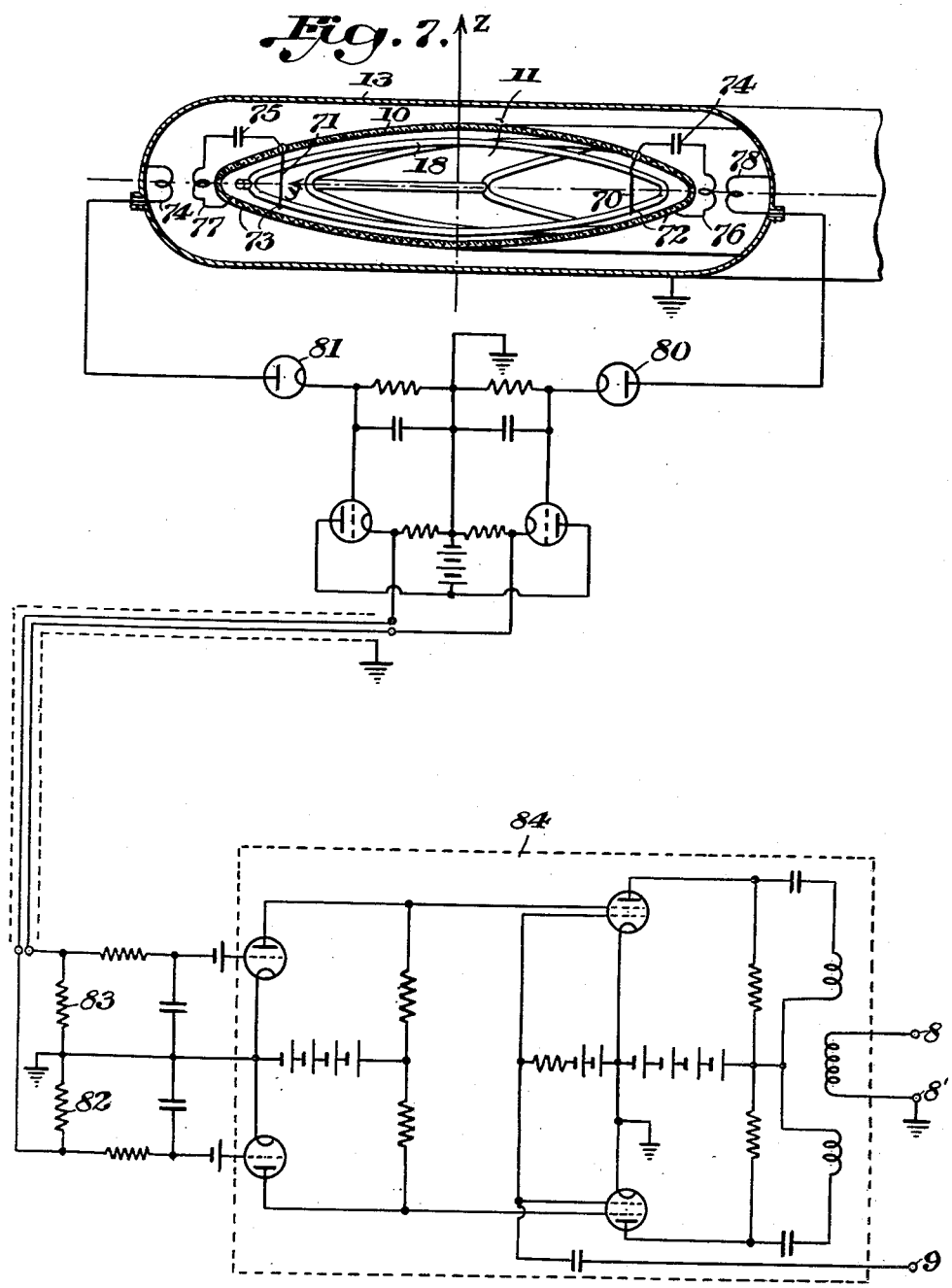
Inventor
N. Christofilos.
(or Philos)
By Wendroth, Lind & Ponack attys.

Patented Sept. 11, 1951

2,567,904

UNITED STATES PATENT OFFICE 2,567,904

MAGNETIC RESONANCE PARTICLE ACCELERATOR

Nicolas Christofilos (or Philos), Athens, Greece

Application June 6, 1947, Serial No. 752,866
In Greece June 22, 1946

6 Claims. (Cl. 250—27)

In the present apparatus the ions or electrons are accelerated by repeatedly crossing a high frequency electric field, while they are guided in a circular orbit of constant radius, within a vacuum tube, by a time varying magnetic field.

The constancy of the orbital radius is obtained by varying the frequency of the electric field during acceleration in such a manner that the latter is at all times in a definite and always the same proportion to the velocity of the accelerate ions or electrons.

The frequency of the electric field is automatically controlled during acceleration by the magnetic field itself, the instantaneous value of the frequency depending solely on the instantaneous value of the intensity, of the magnetic field on the orbit. Consequently, the operation of the apparatus is always possible in whatever manner the magnetic field intensity is varying in time since the way of controlling the rate of the electric field frequency to the magnetic field intensity does not depend on the time.

In addition to the controlling method described above, the electric field frequency is automatically corrected by the accelerated particles themselves by means of an arrangement explained hereinafter.

By means of said arrangement, small errors of the frequency of the electric field on account of which the orbital radius would tend to increase or decrease during acceleration, are checked and corrected.

The general constructional form of the apparatus is the same as that described herebelow and in pending application under Serial No. 686,254 (dated July 25, 1946) now Patent No. 2,531,028.

This apparatus enables also the attainment of a new way for focussing the accelerated electrons or ions electrostatically, means for producing a time varying magnetic field by means of a pulse operated D. C. generator, the way to produce the high frequency accelerating electric field by means of a carrier whose frequency is higher than the gyration frequency of the accelerated particles.

The invention, together with further objects and advantages thereof may best be understood by reference to the following description taken in connection with the accompanying drawings in which:

Fig. 3 is a section taken on line II—II of Fig. 1;

Fig. 4 is a schematic representation illustrating diagrammatically one mode of energization of the magnet coils by means of a D. C. generator and the manner said generator is pulse operated;

Fig. 5 is a section of the glass evacuated vessel on line II—II of Fig. 1;

Fig. 5a is a section of the glass evacuated vessel on line III—III of Fig. 5; and Fig. 5b is a section of the glass evacuated vessel on line V—V of Fig. 5a.

Fig. 6 represents the electrical wiring diagram of connections by means of which the constant and predetermined ratio between the frequency of the accelerating electric field and the velocity of the accelerated particles is obtained.

Fig. 7 shows the general arrangement and the connections of a device by means of which small errors of the frequency of the electric field are connected through the influence of the accelerated particles and the way said device is connected with the arrangement represented in Fig. 6.

Figure 1:
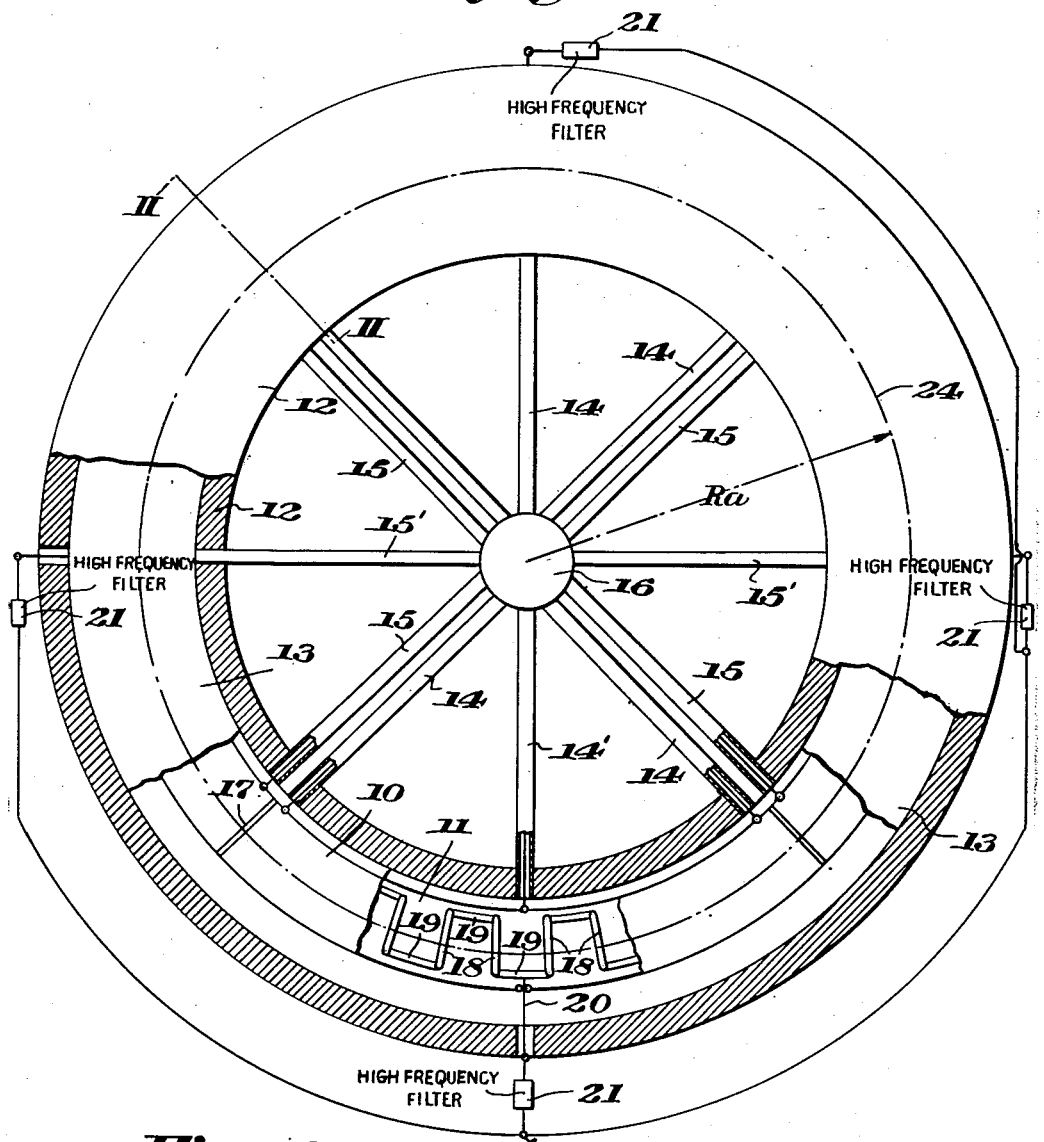
Fig. 1 is a plan view of the apparatus with parts in section taken on line I—I of Fig. 3.

The apparatus consists of a glass vessel 10 (Figs. 1, 3, 5 and 7) having within it an annular evacuated chamber 11 and a magnet 12 enclosing the glass vessel along its entire length. As will be explained later, the vessel 10 encloses a circular orbit of radius R in which electrons or ions may be accelerated to a high energy value, say on the order of several billion volts.

The cross section of the vessel 10 is circular or elliptical. To the inner surface of the glass vessel 10 is applied a metallic coating, such as a thin layer of silver. This metal layer is interrupted at fixed and equal intervals, so that the glass vessel is electrically divided into sectors whose number is even (in Fig. 1 the glass vessel 10 is divided into 4 sectors). Between the vessel 10 and the magnet 12 a tube 13 (Figs. 1, 3 and 7) is inserted, the walls of which have a small thickness and are made of copper or other non-magnetic metal of great conductivity. The tube 13 surrounding the vessel 10 along its entire length is continuous and has no interruptions.

The sectors of the metal layer of the vessel 10 constitute along with tube 13 an equal number of condensers, which have one electrode (the tube 13) common and earthed.

The metallized surface of the vessel 10 as well as the tube 13 are connected by means of suitable coaxial feeders 14, 15 (Figs. 1, 2, 3) to a high frequency amplifier 16.

This connection is made up in such a manner (as represented schematically in Fig. 2) that each sector should have a phase displacement of 180° relative to the foregoing as well as to the following sectors.

The feeding of each sector is effected in a plurality of points as is shown in Fig. 1, so that no stationary waves should be produced along its length.

By this connection of the glass vessel sectors with a high frequency amplifier a high frequency electric field is produced in the gaps 17 (Fig. 1) between the sectors. The electric field produced in a gap between two sectors in succession has also a phase displacement of 180° relative to the foregoing and following gaps.

Inside the vessel 10, rings 18 (Figs. 1, 3, 5, 5a, 5b and 7) are arranged at small intervals. These rings are of circular or elliptical shape similar to the glass vessel section and are made of metal tubes or suitably curved metallised bars of plastic material. The cross section of these rings or bars has an elliptical or circular shape. These rings are electrically insulated from the internal metal layer of the vessel 10. All rings situated in a sector of the metal layer of the glass vessel 10, are connected with each other by means of conductors 19 (Figs. 1, 3, 5, 5a, 5b). Thus the rings form several groups, which are electrically insulated from each other and equal in number to the sectors of the metal layer of the glass vessel. All ring groups are connected by means of conductors 20 and high frequency filters 21 (Fig. 1) to the one pole of a high voltage source 22 (in case of acceleration of electrons this pole should be the negative one) whereas the other pole is connected to the metal layer of the glass vessel.

In Fig. 1 this pole is earthed but the connection to the metal layer is effected through the feeders 14, 15 and the coil 23 (Fig. 2) of the H. F. amplifier.

As a result of the ring charge, an electrostatic force is exerted on the particles which focuses the latter toward the axis 24 of the vessel 10 and compensates the mutual electrostatic repulsive forces.

In order to increase the horizontal electrostatic force, the magnetic poles 25 (Fig. 3) between which the initially mentioned magnetic field is generated, are formed in such a manner that a magnetic focusing force is also exerted on the accelerated particles. To this purpose, the distance between the magnetic poles 25 is variable depending on the radius so that the intensity (H) of the magnetic field varies as a function of the radius R according to the equation.

$$H = A.R.K$$

where $K > 0$ and $A$ is a constant.

Due to the above described formation of the magnetic poles a force is exerted on the particles as a result of which the vertical component of the electrostatic focusing force is slightly decreased while the horizontal component is increased.

By the focusing method explained above a high particle density (of the order of $10^{-5}$ coul./cm.$^3$) can be obtained, which density remains almost constant during the whole course of acceleration. For given dimensions of the evacuated glass vessel 10 it is therefore possible to accelerate a great charge of particles resulting in a great efficiency of the apparatus and more economical construction thereof.

The injection of the particles into the glass vessel is effected through one or more suitable inlet tubes 26 (Figs. 5a and 5b) which are soldered at a small angle $\theta$ on the glass vessel. The particles are injected into the vessel 10 from the outside, because, they must be previously accelerated up to an energy of, at least, several hundred thousands electron volts.

Under the influence of the strong electrostatic field the particles injected at the angle $\theta$, are prevented from striking against the walls of the glass vessel and are set in motion parallel to the orbit, simply undergoing, because of the injection at an angle $\theta$, a vertical harmonic oscillation around the Z axis (Fig. 5). This oscillation is, however, rapidly damped on account of the high frequency currents inducted from the oscillating particles on the rings.

The magnet 12 is divided in upper and lower sections (27 and 28 respectively in Fig. 3). The lower section 28 can be built up by suitable means to form a one piece unit. The upper section 27 can be built up into units weighing a few tons each, so that they may be easily lifted up. The parts of the magnet surrounding the particle injecting tubes consist of smaller pieces on which suitable holes are opened so that said tubes can pass through.

In the cross section of the magnet (Fig. 3) are also shown the glass vessel 10, the tube 13 and four coils 30, 31, 32, 33 (Figs. 3 and 4). The magnet is excited by direct current. The acceleration takes place during the time the magnetic field is formed by the D. C. source.

The general arrangement for the operation of the apparatus by D. C. excitation of the magnetising coils and the wiring diagram thereof are schematically represented in Fig. 4. The magnet excitation coils 30, 31, 32, 33 are energized by a D. C. generator 34. On a common shaft with the generators 34 are connected a fly-wheel 35, an induction motor 36 and a small D. C. generator 37. The excitation field of the generator 34 is energized by the generator 37. The excitation coil 38 of the generator 34 is connected to the generator 37 by means of two switches 39, 40. By connecting and disconnecting the switches 39 and 40 alternately, the magnetic field of the apparatus is charged and discharged periodically by means of the generator 34.

During discharge of the magnetic field, the generator 34 operates as a motor (by reversion of the current direction in the excitation coil 38 thereof), the energy of the magnetic field being transferred into the fly-wheel 35. When the magnetic field is charged, the energy required for charging it is taken from the fly-wheel 35. The motor 36 supplies the system merely with the thermal losses.

The operation of switches 39 and 40 is effected by means of the electronic relay 41, the operation of which is controlled by the voltage drop in the resistor 42 through which passes the excitation current of the magnetic field of the apparatus. The operation is as follows:

Let us suppose that the magnetic field is charged when the switch 39 is closed. When the field intensity attains its maximum value $H_{max}$ (corresponding to an excitation current $I_{max}$ and a voltage drop in the resistor 42, $E_{max}$) the switch 39 opens. After a short time during which the energy of the excitation coil 38 is absorbed by the resistor 43, the switch 40 closes and the magnetic field of the generator 34 is reversed, the latter operating henceforth as a motor. The magnetic field of the apparatus is then discharged and when the intensity of the magnetic field on the orbit becomes zero the switch 40 opens. After a short time the switch 39 closes and the charging starts again. The maximum value of the intensity of the magnetic field at the orbit is found from the well known equation $$H_{max} \cdot R = \frac{(\beta V)_{max}}{300}$$

where $H_{max}$ is in gauss, R the orbit radius is in cm. $\beta$ the maximum relative velocity of the particles ($\beta_{max} \approx 1$) and $V_{max}$ the maximum energy of the particles obtained in the apparatus is in electron volts.

The general form of the magnet, vacuum tube, electrically isolated sectors of even number forming the separation of the vacuum tube, injection arrangement, and focussing arrangement, in the instant method are those described above as involved in the apparatus of copending application Serial No. 686,254 except for the differences concerning the focussing arrangement as follows:

1. In the case of acceleration of positive particles, the focussing rings are positively charged, and the ratio of the magnetic field variation to the radius variation $$K = \frac{dH/H}{dR/R}$$

Figure 2:
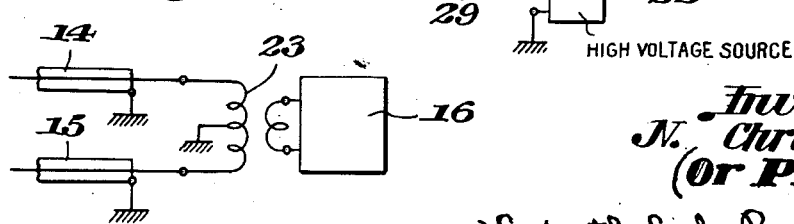
Fig. 2 is a schematic representation illustrating diagrammatically the mode of connection of the feeders, illustrated in Fig. 1, to the output coil of the high frequency source.

(Equation 1 of the pending application mentioned above), is in addition subjected to the following limitation $$K > \frac{\beta_{max}^2}{1-\beta_{max}^2} - \frac{\epsilon_y R^2}{\beta_{max}^2 \cdot V_{max}} \quad (1)$$

where ($\beta_{max}$) is the maximum velocity of the particles obtained in the apparatus and ($\epsilon_y = \delta^2 \varphi / \delta y^2$) where ($\varphi$) is the potential produced by the charged rings and $y$ the horizontal axis (Fig. 2).

2. In the case of acceleration of electrons, the focussing rings are negatively charged, and the coefficient is subject to the limitation:

$$0 < K < \frac{\beta_0^2}{1-\beta_0^2} - \frac{\epsilon_y R^2}{\beta_0^2 V_0} \quad (1a)$$

where ($\beta_0$) is the velocity of the electrons injected into the apparatus. The reason for the limitation will be explained below in the description of the operation of the apparatus. Before describing the apparatus controlling the electric field frequency, I am giving the equations concerning the frequency and intensity of the electric field as a function of the magnetic field intensity on the orbital of a given orbital radius and kind of particles.

R = orbital radius in cms.
$ZeV_r$ = rest energy of the particles in electron volts.
Z = number of elementary charge per particle.
e = elementary charge.
$c = 3.10^{10}$ cm./sec. light velocity in vacuo.
$M_r$ = rest mass of the particles.
$ZeV_0$ = total energy of the particles at their injection into the vacuum tube in electron volts.
$ZeV$ = instantaneous total energy of the particles.
$ZeV_{max}$ = maximum total energy of the particles obtained in the apparatus.
$V_0$, $V$, $V_{max}$ = total voltage of the particles in volts.
$H = H_{max} f(t)$ = instantaneous value of the magnetic field on the orbit (in Gauss).
$H_{max}$ = maximum value of the magnetic field on the orbit.
$f$ = frequency of the accelerating electric field.
$n$ = number of sector pairs in the vacuum tube.
$u = U_0 \sin(2\pi f \cdot t)$ = instantaneous value of the voltage produced in the gap between two sectors of the vacuum tube.
$U_0$ = particles velocity at their injection into the vacuum tube in cm./sec.
U = particles velocity in cm./sec.
$U_{max}$ = maximum value of particles velocity obtained in the apparatus.

$$\beta_0 = \frac{U_0}{C}, \beta = \frac{U}{C}, \beta_{max} = \frac{U_{max}}{C}$$

The total voltage V of the particles, the radius of their orbit R and the magnetic field intensity H on the orbit are connected by equation $$\beta V = 300 HR \quad (2)$$

(This equation is obtained by transforming the well known equation $mU^2/R = Hev/c$) or $$V_r \cdot \beta / (1-\beta^2)^{1/2} = 300 HR \quad (2a)$$

where $$V_r = M_r \cdot c^2 / Ze \quad (2b)$$

The quantity $$H_r = V_r / 300R \quad (3)$$

referred to as the "magnetic constant" of the apparatus for a given kind of particles, is determined by a given kind of particles and orbital radius and is being given in Gauss.

From Equations 2a and 3 we obtain $$H_r = H \frac{(1-\beta^2)^{1/2}}{\beta} \quad (3a)$$

or $$\beta = H / (H^2 + H_r^2)^{1/2} \quad (3b)$$

and $$\beta_{max} = \frac{H_{max}}{(H_{max}^2 + H_r^2)^{1/2}} \quad (3c)$$

The maximum velocity of the particles for a given orbital radius and maximum intensity of the magnetic field on the same is determined from Equation 3c.

It is known that the instantaneous value of the electric field frequency is $$f = \beta \frac{nc}{2\pi R} \quad (4)$$

From Equations 3b and 4 we obtain $$f = \frac{nc}{2\pi R} \cdot \frac{H}{(H^2 + H_r^2)^{1/2}} \quad (5)$$

Equation 5 gives the relation between the instantaneous value of the electric field frequency and the instantaneous value of the magnetic field intensity on the orbit.

The energy that the particles must acquire while crossing each gap is, as we know $$U_s = \frac{V_{max} \cdot \beta_{max}^2}{2f_{max}} \cdot \frac{1}{H_{max}} \cdot \frac{dH}{dt} + \frac{L}{2n} \quad (6)$$

where L is the loss of energy of the particles, per revolution, due to radiation. In the case of positive particles this radiation loss is negligible up to an energy of many billions e. v.

The maximum voltage $U_0$ which must be produced in the gap between two sectors must be considerably higher than $U_s$, namely $$U_0 = U_s \cdot v \quad (7)$$

where $$v \gg 1$$

The general arrangement and wiring diagram of the apparatus, in which, by double successive frequency modulations, the relation of the electric field frequency to the magnetic field intensity is obtained (given by Equation 5) is shown in Fig. 6.

The terminals 1, 2 (Fig. 6) are connected to the terminals 1, 2 of Fig. 4, which are connected with the ends of resistor 42 (Fig. 4) and connected in series with excitation coils 30, 31, 32, 33 (Fig. 4) of the magnet 12C. (Figs. 1, 3). Thus the voltage produced in the resistances 44 is proportional to the intensity of the current in the excitation coil and, consequently, to the intensity of the magnetic field on the orbit. By means of a filter R, C (by which the voltage in the terminals 1, 2, after passing through said filter is reduced in an inversely proportional ratio to the variation frequency of the magnetic field intensity) the terminals 1, 2, are connected to a balanced modulator 45 fed by an oscillator 46 the frequency of which is $f_1$.

By means of the wiring diagram shown in the drawing, we finally obtain that a high frequency E. M. F. $f_2+df$, $f_2$ and $f_2-df$ is respectively produced in the coils 51, 52, 53. The deviation $df$ is proportional to the voltage produced across the terminals 1, 2 and consequently to the intensity of the magnetic field on the orbit, i. e.

$$df = K_1 \cdot H \quad (8)$$

By superposing the voltages produced in the coils 1, 2, 3, a voltage $$\epsilon = \epsilon_1 \cos \cdot 2\pi(f_2+df)t + \epsilon_2 \sin \cdot 2\pi f_2 t + \epsilon_3 \cdot \cos 2\pi(f_2-df)t \quad (8a)$$

is produced between the terminals (3, 4). The voltages $E_1$, $E_2$, $E_3$ are adjusted in such a manner that the ratio between them is $$\epsilon_1 = \epsilon_3 < \tfrac{1}{2}\epsilon_2 \quad (8b)$$

After the detection by the electronic tube $H_3$ a voltage of frequency $df$ is produced across the resistance $R_0$ $$\epsilon_0 = \epsilon_4 \sin 2\pi \cdot df \cdot t = \epsilon_4 \sin \Omega t \quad (8c)$$

where $$\Omega = 2\pi df = 2\pi K_1 \cdot H \quad (8d)$$

The voltages $\epsilon_1$, $\epsilon_2$ and $\epsilon_3$ must be absolutely constant independently of the value of $df$, and this is obtained by suitable arrangements in the final stages of the frequency multipliers.

The resistance 55 is connected to a self-induction coil 56 of inductance $L$ through a resistance 60, 61, 62 of $R_1$ or $R_2$ etc. respectively (according to the position of switch 57).

An E. M. F. of frequency $df$ is produced in the coil 56

$$\epsilon_L = \epsilon_4 \frac{\Omega L}{[(\Omega L)^2 + R_1^2]^{1/2}} \quad (9)$$

By means of electronic valves 58, 59, the H. F. voltage $E_L$ is rectified and a L. F. voltage is produced across the resistances 63

$$\epsilon_5 = K_2 \frac{\Omega L}{[(\Omega L)^2 + R_1^2]^{1/2}} \quad (9a)$$

The resistances 63 are again connected by means of a filter R, C to another balanced modulator 64 fed by the oscillator 65, the frequency of which is $f_3$. By means of that wiring diagram shown in the drawing, it is finally obtained that an E. M. F. of frequency $f_4+df_4$ is produced in the coil 66 and an E. M. F. of constant frequency $f_4$ is produced in the coil 67.

The frequency deviation $$df_4 = K_3 \epsilon_5 = K_4 \frac{\Omega L}{[(\Omega L)^2 + R_1^2]^{1/2}} \quad (10)$$

or $$df_4 = \frac{K_4}{\left[1 + \frac{R_1^2}{(\Omega L)^2}\right]^{1/2}} \quad (10a)$$

where $$\frac{R_1}{\Omega L} = \frac{R_1}{2\pi K_1 \cdot H \cdot L}$$

By suitably adjusting the values $R$, $L$, $K_1$, so that $$R_1/2\pi K_1 L = H_r \quad (10b)$$

then we obtain that $$df_4 = \frac{K_4}{\left[1 + \frac{H_r^2}{H^2}\right]^{1/2}}$$

or $$df_4 = K_4 \cdot \frac{H}{(H^2 + H_r^2)^{1/2}} \quad (11)$$

After the detection by means of the electronic tube 68, a H. F. voltage is produced across the resistance 69

$$\epsilon_r = 15\epsilon_{r0} \left( \frac{\cos \alpha t}{3 \cdot 5} + \frac{\cos 2\alpha t}{5 \cdot 7} + \cdots \right)$$

where $\alpha = 2\pi df_4$.

If the constant $K_4$ is adjusted in such a manner that $(K_4 = nc/2\pi R)$ and we introduce this value in the Equation 11 we obtain $$df_4 = \frac{nc}{2\pi R} \cdot \frac{H}{(H^2 + H_r^2)^{1/2}}$$

or $$df_4 = f = \frac{nc}{2\pi R} \cdot \frac{H}{(H^2 + H_r^2)^{1/2}} \quad (12)$$

The Equation 12 is, however, identical to Equation 5, i. e. the frequency $f$ is the frequency which the electric field must have, depending on the magnetic field intensity, as given by the Equation 5.

The voltage $\epsilon_r$ is suitably amplified by means of a linear amplifier 16, the output terminals of which are connected to the vacuum tube sectors, and to the grounded common metal tube through the feeders 14, 15 Figure 2 as described above and as described in the pending application Serial No. 686,254. Since the frequency varies widely during acceleration from a few hundred up to many thousand kilocycles, the linear amplifier must be suitably built in order to uniformly amplify all this frequency range. The output power of this amplifier depends on the voltage $U_0$ required between the gaps (calculated from the Equation 7) and the capacity between the vacuum tube sectors and the grounded common metal tube. Since the frequency varies between large limits during acceleration, the capacitive load of the vacuum tube cannot be compensated by a self-induction coil (except at a small rate). Consequently, the operation of the apparatus by excitation of the magnet by means of alternating current of 50–60 cycles is not practically advantageous, for, in this case, the power of the amplifier required would reach (owing to the great value of $U_0$) many tens of thousands kva.

For this reason the pulse operation of the apparatus by charging the magnetic field by direct current, as it is described above, is therefore preferable.

In the latter case the duration of the acceleration is of the order of one second for an apparatus in the billion volt range.

Since the frequency practically obtained by means of the frequency controlling system described above, will, on account of different unavoidable errors, slightly differ from that theoretically required, the apparatus is in addition supplied with an arrangement in which this error is automatically corrected by means of the accelerated particles themselves. This arrangement is as follows: Inside the evacuated vessel 10 (Fig. 7) two parts 70, 71 of conductive material and of suitable form or shape are placed, forming with the inner metallized surfaces of the annular evacuated vessel two condensers 72, 73 of capacity $C_1$. These parts are connected by means of other condensers 74, 75 of capacity $C_2$, to two coils 76 and 77 of inductance $L_1$ the ends of which are connected to the metal layer of the vacuum tube. The closed circuits 72, 74, 76 and 73, 75, 77, are tuned to a frequency $f > f_{max}$, where $f_{max}$ is the maximum frequency of the accelerating electric field. When the ellipsoid groups of accelerated particles are passing between condensers 72 and 73 a high frequency E. M. F. is produced in the same, which is proportional to the charge of the ellipsoids. Consequently through the coils 76 and 77 is passing a current of the same frequency, while an E. M. F. of the same frequency is induced in the coils 78 and 79. This E. M. F. is rectified by means of the electronic valves 80, 81 and transferred to the resistances 82 and 83. Supposing that the voltages produced in the resistances 82 and 83, are $U_1$ and $U_2$ respectively, it can be seen that when the particle groups are passing between condensers 72 and 73 exactly in the axis of the vacuum tube, the voltage $U_1 = U_2$. If the orbit radius of the particles increases, the voltage $U_1$ increases, while voltage $U_2$ decreases. The inverse is occurring when the orbit radius decreases.

Resistances 82 and 83 are connected to a balanced modulator 84 by means of which the frequency $f_3$ of the oscillator 65 (Fig. 6) is frequency modulated, as shown in the drawing, Fig. 7.

Thus the alternating E. M. F. produced in the coil 67 has a frequency $f_4$, if voltage $U_1 = U_2$. In the case that $U_1 = U_2$, a modulation of the frequency $f_4$ takes place.

The wiring diagram is made in such a manner that when the radius of the particles increases, the frequency $f_4$ is increased, and accordingly the frequency $f$ of the electric field produced in the gaps of the vacuum tube is decreased in the case of acceleration of heavy particles ($p^+$, $d^+$, $a^{++}$). The inverse must occur in the case of electron acceleration, i. e. in this latter case, when the orbital radius increases, the frequency $f$ must increase. The reason for this difference between electrons and heavy particles is explained below, in the description of the operation of the apparatus.

By means of this arrangement which has been described as operated by the influence of the electric field of the moving particles but could as well be operated by the influence of the magnetic field of said particles (in which case condensers 72 and 73 should be substituted by suitable coils) slight variations of the orbital radius cause considerable variation of the electric field frequency, so that considerable error of the frequency of the accelerating electric field cause slight variations of the orbital radius. The sensibility of this adjustment is proportional to the coefficient $$s = \frac{df/f}{dR/R} \quad (13)$$

the coefficient $s$ must be as great as possible and is negative in the case of heavy particles and positive in the case of electrons. The way of operation of this frequency correcting arrangement, as well as the evaluation of the maximum error that can be thus corrected, are explained below in the description of the operation of the apparatus.

By means of the above described apparatus it is possible to accelerate every kind of particles by changing only in every particular case, by means of the switch 57, the resistance inserted between the resistance 55 and the coil L. Switch 57 on the drawing has three positions. One for electrons a second for protons, and the third for deuterons and alpha particles. In addition, however, to the above four kinds of particles, every kind of ion can be accelerated by simply changing the resistance 60, 61, 62 etc. Of course, in the case of electrons, besides the change of the resistance 60, 61, 62 etc. it is also necessary that the focussing rings are charged negatively and the coefficient $s$ becomes positive (the latter being obtained e. g. by reversion of the poles 8—8' of the coil 7).

*Description of the operation of the apparatus*

The particles are injected into the apparatus through suitable inlet tubes (as described in pending application Serial No. 686,254) after being preliminary accelerated up to an energy of 1–2 M. e. V.

This preliminary acceleration is indispensable in the case of electrons, because the inequality (1a) must be fulfilled. In the case of positive particles, their injection is theoretically possible under whatever small voltage. Since, however, the particle charge which can be accelerated inside the vacuum tube increases with the increase of the initial velocity, it is advisable to give a preliminary acceleration to the positive particles as well, up to the higher possible energy, for reasons of better efficiency of the apparatus.

After their injection into the vacuum tube, the particles form initially a continuous ring, but owing to the fact they are injected under an angle they are oscillating in the direction of both the $y$, $z$ axis. The frequency of the vertical oscillations is $$f_z = \frac{c}{2\pi}\sqrt{\frac{\epsilon_z}{V_0}} \quad (14)$$

while the frequency of the radial oscillations $$f_y = \frac{c}{2\pi R}\sqrt{\beta_0^2(1+K)+\frac{\epsilon_y R^2}{V_0}} \quad (14a)$$

(where $$\epsilon_z = \delta^2\varphi/\delta z^2 \; G_y = \frac{\delta^2\varphi}{\delta y^2}$$

and ($\varphi$) the potential of the electrostatic field produced in the charged focussing rings).

After a few revolutions remain from the initially injected particles, $n$ groups of flattened ellipsoid-like shape, the great axis of which is an arc of the particle orbit of a radius R.

The particles inside the groups are tracing elliptical orbits around the central particle (which crosses the gaps at the moment the voltage $U = U\delta$, oscillating harmonically around it. Let us suppose that the frequency of this oscillation, otherwise called "phase oscillation" is $f_p$. The ratio of the electric field frequency $f$ to the frequency $f_p$ is $$\left(\frac{f}{f_p}=\mu\cdot n\right)$$

or $$\frac{f_0}{f_p}=\mu=\frac{\beta}{n}\sqrt{\frac{\pi V(1+K)}{u_0\cdot\alpha}} \qquad (15)$$

(where $f_0=f/n$) or $$f_p=f_0\cdot\frac{n}{\beta}\sqrt{\frac{u_0\cdot\alpha}{\pi V(1+K)}} \qquad (15a)$$

where $2\pi f_0=\omega$ the angular velocity of the particles.

The ratio of the two horizontal semi-axes (A, B,) of the ellipsoid groups (where A is the large and B the small semiaxis) is $$\frac{A}{B}=\frac{\lambda}{\beta^2(1+K)}\cdot\mu\cdot\frac{(\alpha u_0)}{U_0} \qquad (15b)$$

The coefficient $$\lambda=\frac{dV/V}{dR/R}=\beta^2(1+K)+\frac{\epsilon_y R^2}{V} \qquad (16)$$

The coefficient $$u_0=-\frac{1}{2\pi f}\frac{dU}{dt} \qquad (17)$$

and $|u_0|=U_0$

The coefficient $u_0$ is positive or negative according to the positive or negative value of $dU/dt$ at the moment the central particle is crossing the gap. The coefficient $$\alpha=-\frac{d\omega/\omega}{dV/V}\cdot\beta^2(1+K) \qquad (18)$$

where $\omega$ is the angular velocity of the particles. It is however known that $$d\omega/\omega=d\beta/\beta-dR/R \qquad (18a)$$

From Equations 18 and 18a we obtain $$\alpha=\beta^2(1+K)\left[\frac{dR/R}{dV/V}-\frac{d\beta/\beta}{dV/V}\right] \qquad (18b)$$

It results from Equation 18b that coefficient $\alpha$ is positive as long as $(dR/R>d\beta/\beta)$ for a given $dV/V$ and negative for $(dR/R<d\beta/\beta)$. In the first case, the angular velocity of the particles decreases as long as their energy is increasing; the inverse takes place in the second case. As is well known $$\frac{d\beta/\beta}{dV/V}=\frac{1-\beta^2}{\beta^2} \qquad (18c)$$

From Equations 16, 18b, 18c we obtain $$\alpha=\beta(1+K)\left[\frac{1}{\beta^2(1+K)+\frac{\epsilon_y R^2}{V}}-\frac{1-\beta^2}{\beta^2}\right] \qquad (18d)$$

or $$\alpha=\frac{1}{1+\frac{\epsilon_y R^2}{\beta^2 V(1+K)}}-(1-\beta^2)(1+K) \qquad (19)$$

It results that from Equation 11d coefficient $\alpha$ is positive for $$K<\frac{\beta^2}{1-\beta^2}-\frac{\epsilon_y R^2}{\beta^2 V} \qquad (20)$$

and negative for $$K>\frac{\beta^2}{1-\beta^2}-\frac{\epsilon_y R^2}{\beta^2 V} \qquad (20a)$$

It results from Equation 15, that phase stability and accordingly possibility of particle acceleration exists as long as $$u_0\cdot\alpha>0 \qquad (21)$$

It results from this inequality that phase stability is possible in two cases

1    $\alpha>0$, $u_0>0$ (where $dU/dt<0$)

This case is the known principle of phase stability of the apparatus "synchrotron" proposed by the Russian scientist V. Veksler, the American professor E. M. McMillan and the writer, independently of each other the first two scientists using the known focussing system of betatron apparatus (where $K<0$), whereas we proposed a combination of electrostatic and magnetic focussing arrangement where $K>0$, as explained in detail in the pending application Serial No. 686,254.

In this latter case, to have $\alpha>0$ for the whole duration of acceleration, it is necessary that the value of K be such as to fulfill the inequality 1a.

2    $\alpha<0$ and $u_0<0$ (where $dU/dt>0$)

This case proposed for the first time by the writer, is possible only when $K>0$ K is positive.

In this case, it is necessary that the coefficient $$K>\frac{\beta^2_{max}}{1-\beta^2_{max}}-\frac{\epsilon_y R^2}{\beta^2_{max} V_{max}} \qquad (1)$$

so that coefficient $\alpha$ is negative for the whole duration of acceleration.

In the apparatus described herein the first method of phase stabilization is used in case of electron acceleration, while the second method applies in the case of positive particles.

In the known Synchrotron principle (where $\alpha>0$, $dU/dt<0$) the phase stability is based on the fact that, an ion moving ahead of the equilibrium point acquires more energy than an ion moving at the equilibrium point, and, as the coefficient "$\alpha$" is positive, an energy increase causes a decrease of the angular velocity and so the ion turns back oscillating about the equilibrium point.

In the proposed system of phase stability (where $\alpha<0$) the particles cross the accelerating gaps when $dU/dt>0$. Therefore the phase stability is based on the fact that an ion moving ahead of the equilibrium point acquires less energy than an ion moving at the equilibrium point, and, as the coefficient "$\alpha$" is negative, an energy decrease causes a decrease of the angular velocity, so that the ion turns back and oscillates about the equilibrium point.

The arrangement of automatic frequency correction triggered by the accelerated particles themselves, as it is described above operates as follows:

Suppose, that during acceleration, the frequency changes e. g. by $df$ from the frequency $f$ theoretically required; then the radius of the orbit change by $dR$ where $$dR=\frac{R}{\Lambda-S}\cdot\frac{df}{f} \qquad (22)$$

where $$\Lambda=(1-\beta^2)\left[(1+K)+\frac{\epsilon_y R^2}{\beta^2 V}\right]-1 \qquad (23)$$

$\Lambda$ is positive for $\alpha<0$ and negative for $\alpha>0$ (case of acceleration of electrons). This change of the orbit radius causes, however, radical oscillation of the ellipsoids taken as wholes. The frequency F of this oscillation is $$F = f \sqrt{\frac{u_0 \cdot \alpha_s}{\pi \beta^2 V (1+K)}} \quad (24)$$

where $$\alpha_s = (1+S) \frac{\beta^2(1+K)}{\beta^2(1+K) + \frac{\epsilon_y R^2}{V}} - (1-\beta^2)(1+K) \quad (25)$$

for $\beta \gg \beta_0$ is approximately $$\alpha_s = S \quad (25a)$$

then the Equation 24 becomes $$F = f \sqrt{\frac{u_0 \cdot S}{\pi \beta^2 V (1+K)}} \quad (24a)$$

This radical oscillation causes furthermore phase oscillation of the accelerating electric field and the phase angle of the latter oscillates around the average value $\theta_s$ where as the angular velocity of the particle remains almost constant for $\beta \gg \beta_0$ as if the electric field frequency were the theoretical one (Equation 5). The amplitude of this phase angle oscillation is $$\theta = \left(\frac{df}{f}\right) F \cdot \sqrt{\frac{\pi \beta^2 V (1+K)}{u_0 \cdot S}} \quad (26)$$

where $df$ is the frequency deviation in the time $1/F$. As this deviation is very small the value of the angle $\theta$ at the end of the acceleration could not be greater than a few degrees.

After the particles have been accelerated to the desired degree they are deflected from their orbit so that they may be intercepted by a probe or may be collected into a beam for ejection outside the glass vessel.

In the known synchrotron principle where ($\alpha < 0$) the dimensions of the ellipsoid groups as well as the value of the coefficient $\mu$, $\alpha$, $\lambda$, are considerably influenced by the space charge of the accelerated particles. This influence, being negligible at the beginning of the acceleration, increases constantly during same, and beyond a certain value of the velocity, determined below, the variation of the ellipsoid axes and of the coefficients $\mu$, $\alpha$, $\lambda$ depends mainly in the initial charge of the particles contained in the ellipsoids at their initial formation (at the beginning of the acceleration).

If we call $\Phi$ the potential produced by the space charge of the particles and A, B, C, the three semi-axes of the ellipsoids (A, B are the large and the small horizontal semi-axes, and C the vertical semi-axis), then it is $$\frac{\delta^2 \Phi}{\delta z^2} = \epsilon_z^* = \epsilon_z \left(1 - \frac{\beta^2 KV}{\epsilon_z R^2}\right) \quad (27)$$

It results, from Equation 22 that (since $\epsilon_z^*$ must be positive for the whole duration of acceleration it must be $$\epsilon_z R^2 > \beta^2_{max} \cdot V_{max} K \quad (28)$$

$$\frac{\delta^2 \Phi}{\delta y^2} = \epsilon = \frac{C^2}{B^2} \cdot \epsilon_z^* \quad (a22)$$

$$\frac{\delta^2 \Phi}{\delta x^2} = \epsilon_x = \frac{C^2}{A^2} \cdot \epsilon_z^* \quad (27b)$$

Under the influence of the space charge, the coefficient $\alpha$ and $\lambda$ are reduced as follows $$\alpha = \frac{1+K}{1+K + \frac{(\epsilon_y - \epsilon) R^2}{\beta^2 V}} - (1-\beta^2)(1+K) \quad (29)$$

$$\lambda = \beta^2(1+K) + \frac{(\epsilon_y - \epsilon) R^2}{V} \quad (30)$$

and the coefficient $u_0$ must be multiplied by the coefficient $p$ where $$p = 1 - \frac{\pi \epsilon_z^* R^2}{n^2 U} \cdot \frac{C^2}{A^2} \quad (31)$$

The variation of the three axes of the ellipsoids during acceleration, as well as the variation of the coefficients $\mu$, $\alpha$, $\lambda$, $p$, $\epsilon$ and $\rho$ ($\rho$=the density of the ellipsoid's charge) and found from the following equations.

The values $\mu$, $\alpha$, $\lambda$ given in these equations are those corrected under the influence of the coefficients $\epsilon$ and $p$ $$\mu = \frac{\beta}{n} \sqrt{\frac{\pi V (1+K)}{p \cdot u_0 \cdot \alpha}} \quad (32)$$

$$\alpha = (1+K) \left[ \frac{1}{1+K + \frac{(\epsilon_y - \epsilon) R^2}{\beta^2 V}} - (1-\beta^2) \right] \quad (29)$$

$$\lambda = \beta^2(1+K) + \frac{(\epsilon_y - \epsilon) R^2}{V} \quad (30)$$

$$p = 1 - \frac{\pi \epsilon_z^* R^2}{n^2 U_0} \cdot \frac{C^2}{A^2} \quad (31)$$

$$\epsilon = \frac{C^2}{B^2} \epsilon_z^* \quad (27a)$$

$$\frac{\rho_0}{\rho} = \frac{1}{1 + \frac{\beta^2 V}{\epsilon_z R^2}} \cdot \frac{V_0^2}{V^2} \quad (33)$$

$$A = A_0 \frac{\beta_0^2}{\beta^2} \cdot \left(\frac{\alpha}{\alpha_0}\right)^{1/4} \cdot \frac{\lambda}{\lambda_0} \cdot \left(\frac{V_0}{V}\right)^{1/4} \cdot p^{-1/4} \quad (34)$$

$$B = B_0 \frac{\beta_0}{\beta} \cdot \left(\frac{\alpha_0}{\alpha}\right)^{1/4} \cdot \left(\frac{V_0}{V}\right)^{3/4} \quad (35)$$

$$C = C_0 \frac{\beta^3}{\beta_0^3} \cdot \frac{V}{V_0} \cdot \frac{\lambda_0}{\lambda} \cdot \frac{\rho_0}{\rho} \cdot p^{1/4} \quad (36)$$

From the 9 equations as above are found the 9 unknown quantities A, B, C, $\mu$, $\alpha$, $\lambda$, $p$, $\epsilon$, and $\rho$. The verification is made by the equation $$\frac{A}{B} = \frac{\lambda \mu}{\beta^2(1+K)} \cdot \frac{(\alpha u_0)}{U_0} \quad (37)$$

Values marked with the index 0 are the initial ones. The maximum energy difference which the injected particles must possess at the moment of their injection into the vacuum tube is $$\delta V_0 = \lambda_0 V_0 \frac{2B_0}{R} \quad (38)$$

If said particles are injected through N inlet tubes, the energy difference of the same, between two adjacent inlet tubes, is $$\delta V_N = \frac{\delta V_0}{N-1} \quad (39)$$

As stated above, the influence of the space charge of the particles at the beginning of acceleration is small. However, as the velocity of the particles increases the influence of the space charge increases too, and when the value of the velocity is greater than that given by the following equation $$\beta > \beta_0 \left(\frac{B_0}{C_0}\right)^{1/2} \quad (40)$$

the variations of the ellipsoid dimensions depends mainly on the space charge of the ellipsoids. In this case the coefficients $a$ and $p$ tend to become zero and the values of the semi-axes A, B, C₂ and the coefficients λ, μ, a, p, ε are $$A = \sqrt[3]{\frac{\pi \epsilon_z R^2}{n^2 U_0} A_0 B_0 C_0 \frac{V_0^2}{V^2} \cdot \delta \left( \frac{\epsilon_z R^2 - \beta^2 K V}{\epsilon_z R^2 + \beta^2 V} \right)} \quad (41)$$

where $$\delta^2 = \frac{\epsilon}{\epsilon_z^*} = \frac{\beta^2 V}{\epsilon_z^* R^2} \cdot \frac{[K - \beta^2(1+K)]}{1 - \beta^2} + \frac{\epsilon_y}{\epsilon_z^*} \quad (42)$$

and $$\epsilon = \frac{\beta^2 V}{R^2} \cdot \frac{[K - \beta^2(1+K)]}{1 - \beta^2} + \epsilon_y \quad (42a)$$

$$B = B_0 \left(\frac{A_0}{A}\right)^{1/2} \left(\frac{C_0}{B_0}\right)^{1/2} \frac{V_0}{V} \delta^{3/2} (1 + \beta^2 V / \epsilon_z R^2)^{-1/2} \quad (43)$$

$$C = C_0 \left(\frac{A_0}{A}\right)^{1/2} \left(\frac{B_0}{C_0}\right)^{1/2} \frac{V_0}{V} \delta^{-1/2} (1 + \beta^2 V / \epsilon_z R^2)^{-1/2} \quad (44)$$

$$\lambda = \frac{\beta^2}{1 - \beta^2} \quad (45)$$

$$p = \frac{A_0}{A} \cdot \frac{B_0}{C_0} \cdot \frac{\beta_0^4}{\lambda_0^2} \cdot \left(\frac{\beta_0}{\beta}\right)^2 \cdot \left(\frac{V}{V_0}\right)^4 \cdot \left(1 + \frac{\beta^2 V}{\epsilon_z R^2}\right) \delta \quad (46)$$

$$\alpha = \alpha_0 \left(\frac{B_0}{C_0}\right)^2 \cdot \left(\frac{\beta_0}{\beta}\right)^4 \cdot \frac{V}{V_0} \cdot \left(1 + \frac{\beta^2 V}{\epsilon_z R^2}\right) \left(\frac{A}{A_0}\right)^2 \delta^2 \quad (47)$$

$$\mu = \mu_0 \left(\frac{C_0}{B_0}\right)^{3/2} \frac{\lambda_0}{\beta_0^2} \left(\frac{\beta}{\beta_0}\right)^4 \cdot \left(\frac{V_0}{V}\right)^2 \cdot \left(\frac{A_0}{A}\right)^{1/2} \delta^{-3/2} \left(1 + \frac{\beta^2 V}{\epsilon_z R^2}\right)^{-3/2} \quad (48)$$

The values found from the Equations 36, 37, 38, 39, 40, 43 are accurate, as long as the values of $p$ and $\alpha$ found from the Equations 41, 42, are too small. The charge $q$ contained within the vacuum tube is $$q = \frac{4}{3} \pi \cdot A_0 B_0 C_0 \rho_0 \cdot n \quad (49)$$

and $$\rho_0 = \epsilon_z / 4\pi \quad (50)$$

or $$q = 3.7 \cdot 10^{-4} \cdot n \cdot A_0 \cdot B_0 C_0 \cdot \epsilon_z (\mu \text{ coulomb.}) \quad (51)$$

where $A_0$, $B_0$, $C_0$ in cm. and $\epsilon_z$ in volt/cm².

The arrangement of automatic frequency adjustment by the particles themselves, operates as follows:

If during acceleration, the frequency change e. g. by $df$ from the frequency $f$ theoretically required the radius of the orbit tends to change by $$dR = \frac{R}{s} \cdot \frac{df}{f}$$

This change causes, however, radial oscillation of the ellipsoids taken as wholes, and the frequency of this oscillation is $$F = \frac{f}{\beta} \sqrt{\frac{u_0 \cdot \alpha^*}{\pi V (1+K)}} \quad (52)$$

where $$\alpha^* = s \cdot \frac{\beta^2 (1+K)}{\beta^2 (1+K) + \frac{\epsilon_y R^2}{V}} - (1 - \beta^2)(1+K) + \frac{\beta^2 (1+K)}{\beta^2 (1+K) + \frac{\epsilon_y R^2}{V}} \quad (53)$$

for $\beta/\beta_0 \gg 1$ is very approximately $$\alpha^* = s \quad (53a)$$

then the Equation 47 becomes $$F = f \sqrt{\frac{u_0 s}{\pi V (1+K) \beta^2}} \quad (54)$$

During this oscillation the orbital radius varies periodically from value R up to value $R + 2dR$ and the average orbital radius is $R + dR$. The electric field frequency oscillates from $f$ up to value $f + 2df$, the average value being $f + df$. This means that an increase of frequency by $df$ causes an increase of the average orbital radius by $$dR = \frac{R \, df}{sf}$$

as well as radial oscillations around the new average value $R + dR$, of amplitude $dR$ and frequency oscillation around the new average value $f + df$ of amplitude $df$, these oscillations having a frequency F.

Owing to the frequency oscillation, the phase angle of the electric field oscillates as well around the average value $$\theta_s = \arcsin \left(\frac{U\delta}{U_0}\right) \quad (55)$$

whereas the angular velocity of the particles remains almost constant for $\beta/\beta_0 \gg 1$, as if the electric field frequency were the theoretical one. The maximum amplitude of this phase angle oscillation is $$\theta = \frac{dR}{R} s \cdot \beta \sqrt{\frac{\pi V (1+K)}{u_0 \cdot S}} \quad (56)$$

or $$\theta = \frac{df}{f} \sqrt{\frac{\pi \beta^2 V (1+K)}{u_0 \cdot S}} \quad (56a)$$

Since the maximum value of the amplitude of the phase angle oscillation must not exceed a fixed value $\theta_{max}$ (where $$\theta_{max} = \frac{\pi}{4} \sim \frac{\pi}{3}$$

according to the length of the ellipsoid groups and the value of $\theta_s$), the phase stability being destroyed in case this fixed value is exceeded, the maximum frequency error which can be corrected is $$\epsilon = \left(\frac{df}{f}\right)_{max} = \theta_{max} \sqrt{\frac{u_0 \cdot S}{\pi \beta^2 V (1+K)}} \quad (57)$$

In the case the arrangement of frequency correction would not exist, the maximum error permitted would be $$\epsilon_0^+ = \theta_{max} \sqrt{\frac{U_0[K - \beta^2(1+K)]}{\pi \beta^2 V (1+K)}} \quad (57a)$$

for positive particles and $$\epsilon_0^- = \theta_{max} \sqrt{\frac{U_0}{\pi V (1+K)}} \quad (57b)$$

for electrons.

The frequency error which can be corrected by means of the correction arrangement above described is in the practice about 50 to 100 times greater that the error permitted without this arrangement.

The coefficient $s$ must be negative in the case of positive particles (where "a'" is also negative) and positive in case of electrons (where coefficient "a" is also positive).

I give hereafter the data for an apparatus accelerating protons, deuterons and alpha particles up to $\beta_{max} = 0.88$, and electrons up to $$eV_{max} = 1500 \text{ m. e. v}$$

Maximum intensity of magnetic field:
- On the orbit _____ $H_{max}$=5660 gauss.
- Orbital radius _____ R=2100 cm.
- Magnetic poles width_ 20 cm.

Clearance height of vacuum tube _____ 4 cm.
Magnet weight _____ 300 tons
Weight of the copper of the magnet excitation coil _____ 40 tons
Duration of acceleration__ 0.4 sec.
Period of a full cycle of magnetic field charging and discharging _____ 1 sec.
Number of pulses per minute _____ 60
- Coefficient _____ K=4
- Coefficient _____ $\epsilon_z$=3 kv./cm.$^2$
- Coefficient _____ $\epsilon_y$=20 v./cm.$^2$ Number of sector pairs in the vacuum tube_____ n=4
Maximum H. F. voltage produced in the gap____ $U_0$=2.5 kv.
Peak power of direct current generator _____ 4000 kw.
Average consumption for magnetic field excitation_ 400 kw.
Peak value of output power of the amplifier LA_____ 500 kw.
Average consumption for feeding the output tubes of the amplifier LA_____ 500 kw.
Average value of ionic current (for $\beta_0$=0.04 approximately) _____ 1 μa.
Maximum energy given to particles alpha _____ $2eV_{max}$=8000 m. e. v.
Maximum energy given to deuterons _____ $eV_{max}$=4000 m. e. v.
Maximum energy given to protons _____ $eV_{max}$=2000 m. e. v.
(In the latter case the maximum intensity of the magnetic field on the orbit is 2830 gauss).
Maximum energy given to electrons _____ $eV_{max}$=1500 m. e. v.

According to Equation 2, this latter could reach the value of 3600 m. e. v. (for $H_{max}$=5660 gauss), but owing to the radiation losses, the angle $\theta_s$ (Equation 50) reaches the value $\pi/2$ (for $U_0$=2.5 kv., n=4) for $V/V_0$=2950. Accordingly, the value 1500 m. e. v. is the limit value for zero electronic charge. For the maximum possible charge for electrons (0.1 μcoul. about per pulse) the maximum energy is $eV_{max}$=1300 m. e. v. The maximum frequency error permitted is approximately 1% for positive particles and electrons up to a maximum energy of 1300 m. e. v.

Consequently, the apparatus of frequency adjustment, according to Equation 5, must secure the frequency $f$ with an error less than 1% which does not present any technical difficulty. Without this arrangement of automatic frequency correction, the maximum error permitted would be about 0.01% which would be practically impossible.

Having now particularly described and ascertained the nature of my said invention and in what manner the same is to be performed, I declare that what I claim is:

1. A method for the electronic acceleration of ions and electrons comprising the steps of producing a time varying magnetic field for guiding the accelerated particles within an annular evacuated inner metallized glass vessel, providing an even number of electrically insulated sectors along the inner metallized surface of annular evacuated glass vessel, connecting said sectors to a high frequency amplifier, providing from said amplifier a high frequency accelerating electrical field to each sector and having a phase displacement of 180° between each of successive gaps in the sectors along the inner surface of the glass container, and varying the frequency of said high frequency accelerating field during the electronic acceleration step, and thereafter maintaining the frequency of the high frequency accelerating field at a fixed and predetermined ratio to the velocity of the accelerated particles.

2. A method for the electronic acceleration of ions and electrons comprising the steps of producing a high frequency accelerating field, producing a time varying magnetic field to guide the accelerated particles, providing a circular orbit for the accelerated particles within an annular evacuated inner metallized glass vessel, providing the inner metallized surfaces of said circular orbit with an even number of electrically insulated sectors, connecting said sectors with a high frequency amplifier to produce a phase displacement of 180° in the gaps between successive sectors of the circular orbit, varying the frequency of the high frequency accelerating field during the electronic acceleration step, by frequency modulating the frequency of an oscillator by imposing thereon a signal directly proportional to the magnetic field intensity of the circular orbit, isolating the frequency deviation by superimposing the frequency modulated frequency upon the unmodulated frequency of said oscillator and subsequent rectification, maintaining the constancy of the electromotive force of the isolated frequency deviation, thereafter applying the constant value of the electromotive force of the isolated frequency deviation to a circuit comprising a resistor of resistance R and a self-induction coil of inductance L in series, selecting the L/R ratio of the resistor coil circuit to obtain a function of the variation of the high frequency electromotive force produced by the self-induction coil to the frequency of the constant electromotive force applied to the resistor coil circuit, identical to the function represented by the variation of the velocity of the accelerated particles to the intensity of the orbital magnetic field, rectifying the high frequency electromotive force produced by the self-induction coil to produce a signal thereby, frequency modulating a second oscillator with the rectified signal obtained from the self-induction coil, obtaining and isolating the frequency deviation of the rectified signal by superimposing the frequency modulated frequency upon the unmodulated frequency of said second oscillator and subsequent rectification said isolated frequency deviation being proportional to the velocity of the accelerated particles by applying the electromotive force of the derived frequency deviation to the input of a high frequency linear amplifier and by connecting the output of the high frequency amplifier to the sectors of the annular evacuated glass vessel thereby maintaining the high frequency accelerating electrical field at a fixed and predetermined ratio to the velocity of the accelerated particles.

3. A method for the electronic acceleration of ions and electrons comprising the steps of producing a high frequency accelerating field, producing a time varying magnetic field to guide the accelerated particles, providing a circular orbit for the accelerated particles within an annular evacuated inner metallized glass vessel, providing the inner metallized surfaces of said circular orbit with an even number of electrically insulated sectors, connecting said sectors with a high frequency amplifier to produce a phase displacement of 180° in the gaps between successive sectors of the circular orbit, varying the frequency of the high frequency accelerating field during the electronic acceleration step, by frequency modulating the frequency of an oscillator which has imposed thereon a signal directly proportional to the magnetic field intensity of the circular orbit, isolating the frequency deviation by superimposing the frequency modulating frequency, the unmodulated frequency of said oscillator and subsequent rectification maintaining the constancy of the electromotive force of the isolated frequency deviation, thereafter applying the constant value of the electromotive force of the isolated frequency deviation to a circuit comprising a resistor of resistance R and a self-induction coil of inductance L in series, selecting the $L/R$ ratio of the resistor coil circuit to obtain a function of the variation of the high frequency electromotive force produced by the self-induction coil to the frequency of the constant electromotive force applied to the resistor coil circuit, identical to that function represented by the variations of the velocity of the accelerated particles to the intensity of the orbital magnetic field, rectifying the high frequency electromotive force produced by the self-induction coil to produce a signal thereby, frequency modulating a second oscillator with the rectified signal obtained from the self-induction coil to obtain therefrom a frequency deviation proportional to the velocity of the accelerated particles, isolating the frequency deviation obtained from superimposing the frequency modulated frequency and the unmodulated frequency and subsequent rectification, said oscillating frequency deviation being proportional to the velocity of the accelerated particles, applying the rectified wave signal to the input of a high frequency linear amplifier, the output of said amplifier connected to the sectors of the annular evacuated glass vessel thereby maintaining the high frequency accelerating electric field at a fixed and predetermined ratio to the velocity of the accelerated particles, thereafter automatically clearing small errors in the frequency of the high frequency accelerating field by the effect of the high frequency electric field produced by the rapidly moving charged groups of the accelerated particles, said high frequency electric field resulting in an electromotive force on the plates of two condensers placed within the evacuated annular glass vessel and symmetrical to the axis of said vessel, the condensers acting to maintain an electromotive force between their plates and the metallized inner surface of the evacuated glass vessel resulting from the passage of the moving charged groups of the accelerated particles between the plates of the condensers, thereafter rectifying the electromotive force from the condensers by means of valves and applying to the input of a balanced modulator such electromotive force to produce a frequency deviation when the electromotive forces resulting on the plates of the two condensers, from the passage of the moving charged groups of the accelerated particles, are not equal to each other, thereafter imposing said frequency deviation with the frequency modulated frequency of the second oscillator to control the frequency of the high frequency accelerating field and to maintain the orbital radius constant.

4. A method for the electronic acceleration of ions and electrons comprising the steps of producing a time varying magnetic field for guiding the accelerated particles within an annular evacuated inner metallized glass vessel, providing an even number of electrically insulated sectors along the inner metallized surface of annular evacuated glass vessel, connecting said sectors to a high frequency accelerating electrical field to each sector and having a phase displacement of 180° between each of successive gaps in the sectors along the inner surface of the glass container, and varying the frequency of said high frequency accelerating field during the electronic acceleration step, and thereafter maintaining the frequency of the high frequency accelerating field at a fixed and predetermined ratio to the velocity of the accelerated particles producing a magnetic field substantially perpendicular to the orbit plane and increasing in intensity as said orbit radius increases, the ratio (K) of the percentages increasing of the intensity of the magnetic field to the percentage increase of the radius being greater than the product of the square of the maximum relative velocity ($C^2_{max}$) of the ions obtained in the apparatus multiplied by the square of the ratio $$\left(\frac{V^2_{max}}{V^2_r}\right)$$

of the maximum energy of the ions to their rest energy $$\left(K > C^2_{max} > \frac{V^2_{max}}{V^2_r}\right)$$

5. A method for the electronic acceleration of ions and electrons comprising the steps of producing a time varying magnetic field for guiding the accelerated particles within an annular evacuated inner metallized glass vessel, providing an even number of electrically insulated sectors along the inner metallized surface of annular evacuated glass vessel, connecting said sectors to a high frequency amplifier, providing from said amplifier a high frequency accelerating electrical field to each sector and having a phase displacement of 180° between each of successive gaps in the sectors along the inner surface of the glass container, and varying the frequency of said high frequency accelerating field during the electronic acceleration step, and thereafter maintaining the frequency of the high frequency accelerating field at a fixed and predetermined ratio to the velocity of the accelerated particles producing a magnetic field substantially perpendicular to the orbit plane and increasing in intensity as said orbit radius increases, the ratio (K) of the percentage increasing of the intensity of the magnetic field to the percentage increase of the radius being smaller than the product of the square of the initial relative velocity of the electrons ($C^2_0$) multiplied to the square of the ratio of the initial energy of the injected electrons ($V^2_0$) to their rest energy ($V^2_r$) or $$\left(K < C^2_0 - \frac{V^2_0}{V^2_r}\right)$$

6. A method for the electronic acceleration of ions and electrons comprising the steps of producing a high frequency accelerating field, producing a time-varying magnetic field for guiding the accelerated particles in a circular orbit within an annular evacuated glass vessel, said time-varying magnetic field being substantially perpendicular to the orbit plan, said magnetic field produced by means of a magnet surrounding said glass vessel along its whole length, the excitation coils of said magnet being energized by means of a direct current generator, the excitation field of said generator being alternately reversed by means of suitable switches as the magnetic field intensity at said orbit reaches predetermined maximum and minimum values so that said generator operates alternately as a motor discharging the magnetic field energy and transferring said energy to a fly-wheel and as a generator taking up energy from said fly-wheel and charging the magnetic field, the acceleration of the particles being effected during the charge of said magnetic field.

NICOLAS CHRISTOFILOS (OR PHILOS).

REFERENCES CITED

The following references are of record in the file of this patent:

UNITED STATES PATENTS

| Number | Name | Date |
|---|---|---|
| 2,103,303 | Steenbeck | Dec. 28, 1937 |
| 2,193,602 | Penney | Mar. 12, 1940 |
| 2,331,788 | Baldwin | Oct. 12, 1943 |
| 2,394,070 | Kerst | Feb. 5, 1946 |
| 2,394,071 | Westendorp | Feb. 5, 1946 |
| 2,425,657 | Tunick | Aug. 12, 1947 |